United States Patent
Nakano et al.

(10) Patent No.: US 12,142,899 B2
(45) Date of Patent: Nov. 12, 2024

(54) WIRING MEMBER

(71) Applicant: Sumitomo Wiring Systems, Ltd., Mie (JP)

(72) Inventors: Haruka Nakano, Mie (JP); Motohiro Yokoi, Mie (JP); Kenta Ito, Mie (JP); Toshio Shimizu, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 254 days.

(21) Appl. No.: 17/914,419

(22) PCT Filed: Mar. 12, 2021

(86) PCT No.: PCT/JP2021/010063
§ 371 (c)(1),
(2) Date: Sep. 26, 2022

(87) PCT Pub. No.: WO2021/200034
PCT Pub. Date: Oct. 7, 2021

(65) Prior Publication Data
US 2023/0106640 A1    Apr. 6, 2023

(30) Foreign Application Priority Data
Mar. 31, 2020    (JP) .................... 2020-062131

(51) Int. Cl.
*H02G 3/04* (2006.01)
*B60R 16/02* (2006.01)
(Continued)

(52) U.S. Cl.
CPC ....... *H02G 3/0418* (2013.01); *B60R 16/0215* (2013.01); *H01B 7/04* (2013.01); *H01B 7/08* (2013.01); *H02G 3/0437* (2013.01)

(58) Field of Classification Search
CPC ........ H02G 3/32; H02G 3/0437; H02G 3/305; B60R 16/0215; H01B 7/08; H01B 7/0846; H01B 7/0045
See application file for complete search history.

(56) References Cited

U.S. PATENT DOCUMENTS 5,895,889 A * 4/1999 Uchida ............... B60R 16/0207
                                                        174/72 A
6,126,228 A * 10/2000 Davis, Jr. ............ B60R 16/0222
                                                        296/146.7
(Continued)

FOREIGN PATENT DOCUMENTS

JP      61-35318        3/1986
JP      9-35539         2/1997
(Continued)

OTHER PUBLICATIONS

Japan Office Action issued in JP Application No. 2020-062131, dated Jul. 4, 2023.
(Continued)

*Primary Examiner* — Paresh Paghadal
(74) *Attorney, Agent, or Firm* — GREENBLUM & BERNSTEIN, P.L.C.

(57) ABSTRACT

In a base member arrangement section, a plurality of wire-like transmission members are divided into at least a first wire-like transmission member bundle and a second wire-like transmission member bundle, and the cover member is fixed to the base member at positions on both sides of the first wire-like transmission member bundle and the second wire-like transmission member bundle and a position between the positions on the both sides to cover the first wire-like transmission member bundle and the second wire-like transmission member bundle. In a non-base member arrangement section, the plurality of wire-like transmission members include a large bundle part where the first wire-like
(Continued)

transmission member bundle and the second wire-like transmission member bundle are bundled together.

12 Claims, 7 Drawing Sheets

(51) Int. Cl.
  *H01B 7/04* (2006.01)
  *H01B 7/08* (2006.01)

(56) References Cited

U.S. PATENT DOCUMENTS

| | | | |
|---|---|---|---|
| 6,407,337 B1 * | 6/2002 | Ogawa | B60R 16/0215 174/157 |
| 6,528,731 B2 | 3/2003 | Murakami et al. | |
| 2003/0091313 A1 * | 5/2003 | Paradiso | B60R 16/0207 385/88 |
| 2017/0327060 A1 | 11/2017 | Nakajima | |
| 2018/0005726 A1 * | 1/2018 | Hiramitsu | H01B 3/308 |

FOREIGN PATENT DOCUMENTS

| | | |
|---|---|---|
| JP | 2002-67829 | 3/2002 |
| JP | 2002-163934 | 6/2002 |
| JP | 2010-27242 | 2/2010 |
| JP | 2012-157095 | 8/2012 |
| WO | 2013/168633 | 11/2013 |
| WO | 2014/038259 | 3/2014 |
| WO | 2016/098657 | 6/2016 |

OTHER PUBLICATIONS

International Search Report issued in International Patent Application No. PCT/JP2021/010063, dated May 18, 2021, along with an English translation thereof.

* cited by examiner

US 12,142,899 B2

WIRING MEMBER

TECHNICAL FIELD

The present disclosure relates to a wiring member.

BACKGROUND ART

Patent Document 1 discloses a wire harness including an electrical wire bundle, a base body additionally attached to the electrical wire bundle, and a flexible and shock-absorbing covering body overlapped with the base body to sandwich the electrical wire bundle with the base body.

PRIOR ART DOCUMENTS

Patent Documents

Patent Document: Japanese Patent Application Laid-Open No. 2010-27242

SUMMARY

Problem to be Solved by the Invention

It is desired that a height dimension is reduced in a wiring member in which a wire-like transmission member bundle is disposed on a base member as with the wire harness described in Patent Document 1. However, when a wire-like transmission member constituting the wire-like transmission member bundle increases in accordance with increase in a connection destination, for example, the wire-like transmission member bundle gets large, so that there is a possibility that the height dimension cannot be suppressed even in a case where the wire-like transmission member bundle is disposed on the base member. Particularly, there is more need for suppressing a height dimension of the wiring member on the base member.

Accordingly, an object is to provide a technique capable of suppressing a height dimension of a wiring member on a base member in a wiring member in which the wire-like transmission member bundle is disposed on the base member.

Means to Solve the Problem

A wiring member according to the present disclosure is a wiring member including: a plurality of wire-like transmission members; a base member in which the plurality of wire-like transmission members are disposed on at least one surface; and a cover member holding the plurality of wire-like transmission members in a state of being disposed on the base member, wherein the plurality of wire-like transmission members include: a base member arrangement section disposed on the base member; and a non-base member arrangement section which is not disposed on the base member, in the base member arrangement section, the plurality of wire-like transmission members are divided into at least a first wire-like transmission member bundle and a second wire-like transmission member bundle, the cover member is fixed to the base member at positions on both sides of the first wire-like transmission member bundle and the second wire-like transmission member bundle and a position between the positions on the both sides to cover the first wire-like transmission member bundle and the second wire-like transmission member bundle, and in the non-base member arrangement section, the plurality of wire-like transmission members constitute a large bundle part where the first wire-like transmission member bundle and the second wire-like transmission member bundle are bundled together.

Effects of the Invention

According to the present disclosure, a height dimension of a wiring member on a base member can be suppressed in the wiring member in which a wire-like transmission member bundle is disposed on the base member.

DESCRIPTION OF EMBODIMENT(S)

Description of Embodiment of Present Disclosure

Figure 1:
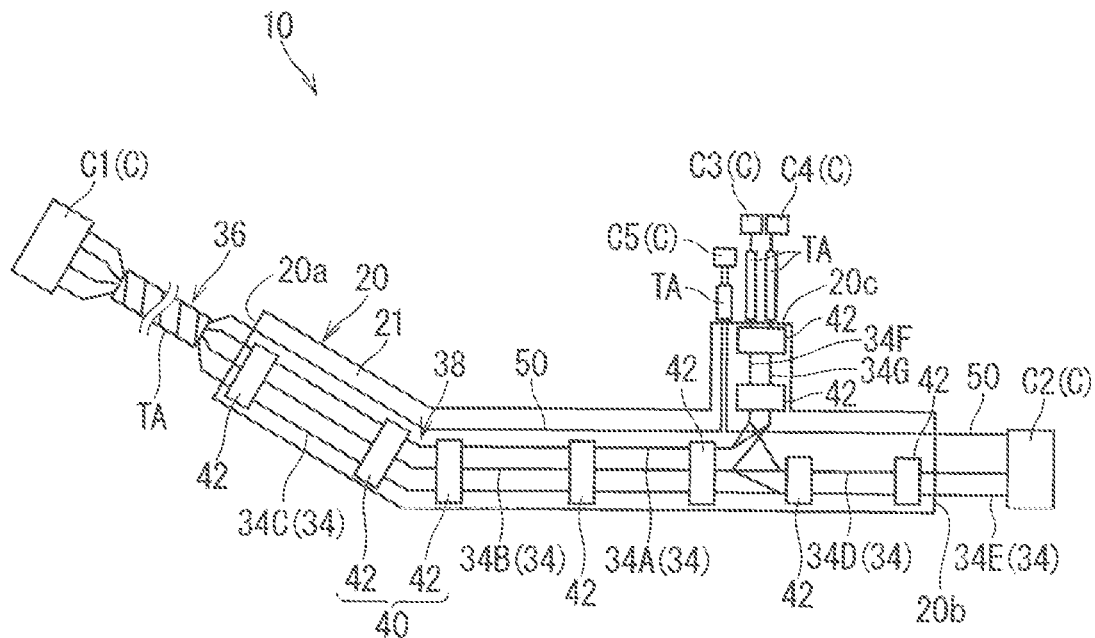
FIG. 1 is a schematic plan view illustrating a wiring member according to an embodiment 1.

Embodiments of the present disclosure are listed and described firstly.

A wiring member according to the present disclosure is as follows.

(1) A wiring member includes: a plurality of wire-like transmission members; a base member in which the plurality of wire-like transmission members are disposed on at least one surface; and a cover member holding the plurality of wire-like transmission members in a state of being disposed on the base member, wherein the plurality of wire-like transmission members include: a base member arrangement section disposed on the base member, and a non-base member arrangement section which is not disposed on the base member, in the base member arrangement section, the plurality of wire-like transmission members are divided into at least a first wire-like transmission member bundle and a second wire-like transmission member bundle, the cover member is fixed to the base member at positions on both sides of the first wire-like transmission member bundle and the second wire-like transmission member bundle and a position between the positions on the both sides to cover the first wire-like transmission member bundle and the second wire-like transmission member bundle, and in the non-base member arrangement section, the plurality of wire-like transmission members include a large bundle part where the first wire-like transmission member bundle and the second wire-like transmission member bundle are bundled together. The plurality of wire-like transmission members extend as the large bundle part in the non-base member arrangement section, and extend to be divided into the first wire-like transmission member bundle and the second wire-like transmission member bundle in the base member arrangement section, thus the height dimension of the wiring member can be suppressed in the base member arrangement section. The cover member is fixed to the base member at the positions on the both sides of the fast wire-like transmission member bundle and the second wire-like transmission member bundle and the position between the positions on the both sides, thus suppressed is that the wiring member has unintended height dimension due to a condition that the wire-like transmission members of each wire-like transmission member bundle are mixed. Accordingly, the height dimension of the wiring member on the base member can be suppressed in the wiring member in which the wire-like transmission member bundle is disposed on the base member.

(2) In the wiring member according to (1), it is also applicable that a plurality of fixing parts each made up of the cover member and the base member fixed to each other are provided at intervals along an extension direction of the first wire-like transmission member bundle and the second wire-like transmission member bundle, and at least one shift region in which at least one wire-like transmission member constituting the first wire-like transmission member bundle transitions to the second wire-like transmission member bundle is provided between the plurality of fixing parts. Accordingly, when the large bundle part is divided into the plurality of wire-like transmission member bundles, the wire-like transmission member bundle needs not be set for each route, thus the number of the wire-like transmission member bundles and a thickness of each wire-like transmission member bundle can be appropriately set easily.

(3) In the wiring member according to (2), two or more of the wire-like transmission members constituting the first wire-like transmission member bundle may transition to the second wire-like transmission member bundle in one of the shift regions. Accordingly, a wide dispersion of the shift region on the base member can be suppressed.

(4) In the wiring member according to any one of (1) to (3), the base member and the cover member may be fused and fixed to each other. Accordingly, a member for fixing the cover member and the sheet can be omitted in the wiring member.

(5) In the wiring member according to any one of (1) to (4), a plurality of wire-like transmission members constituting at least the first wire-like transmission member bundle may include a wire-like transmission member having a covering layer formed of a material different from a material constituting the at least one surface. Accordingly, the wire-like transmission member hardly fused to the base member directly is held on the base member by the cover member.

(6) In the wiring member according to any one of (1) to (5), it is also applicable that when each of the plurality of wire-like transmission members covered by the cover member is a first wire-like transmission member, the wiring member further includes a second wire-like transmission member including a transmission wire body and a covering layer covering the transmission wire body and disposed on the at least one surface, and the covering layer of the second wire-like transmission member is fused to the at least one surface. Accordingly, the second wire-like transmission member is directly fixed to the base member.

(7) In the wiring member according to any one of (1) to (6), it is also applicable that the first wire-like transmission member bundle includes a bending part disposed along a curved route on the at least one surface, and the cover member is fixed to the base member in positions on both sides of the bending part. Accordingly, when the wire-like transmission member is pulled toward an outer side of the base member, suppressed is a positional deviation of the wire-like transmission member and the base member along the extension direction of the wire-like transmission member.

(8) In the wiring member according to any one of (1) to (7), it is also applicable that the first wire-like transmission member bundle includes a tape winding part in which an adhesive tape is wound, and the cover member is fixed to the base member in a lateral position of a portion covering the tape winding part. Accordingly, the wire-like transmission member bundle is hardly unstuck in the tape winding part, and when the cover member and the base member are fixed, suppressed is the wire-like transmission member caught between the cover member and the base member.

(9) In the wiring member according to any one of (1) to (8), an extra length absorbing part absorbing an extra length of the wire-like transmission member may be provided on the base member. Accordingly, a tolerance of the wire-like transmission member is absorbed on the base member.

(10) In the wiring member according to (9), it is also applicable that a first fixing part and a second fixing part in which the cover member and the base member are fixed are provided at intervals along an extension direction of the first wire-like transmission member bundle and the second wire-like transmission member bundle, and the extra length absorbing part includes a detour route part in which a route of the wire-like transmission member extends along a roundabout route compared with a shortest route between the first fixing part and the second fixing part. Accordingly, the extra length absorbing part can be simply provided.

(11) In the wiring member according to (10), the cover member may include a portion covering the detour route part. Accordingly, suppressed is an outward protrusion of the extra length part of the wire-like transmission member.

(12) In the wiring member according to any one of (1) to (11), the cover member includes a plurality of band sheets provided at intervals along the extension direction of the first wire-like transmission member bundle and the second wire-like transmission member bundle, and each of the plurality of band sheets is fixed to the base member at positions on both sides of the first wire-like transmission member bundle and the second wire-like transmission member bundle and a position between the positions on the both sides. Accordingly, the cover member needs not be provided in the whole base member.

(13) In the wiring member according to any one of (1) to (12), the first wire-like transmission member bundle and the second wire-like transmission member bundle may extend to an outer side of the base member from a plurality of end portions of the base member. Accordingly, the wire-like transmission member can be easily kept in a state of being divided into a plurality of wire-like transmission member bundles on the base member.

Details of Embodiment of Present Disclosure

Specific examples of a wiring member of the present disclosure are described hereinafter with reference to the drawings. The present disclosure is not limited to these examples, but is indicated by claims, and it is intended that meanings equivalent to claims and all modifications within a scope of claims are included.

Embodiment 1

Figure 2:
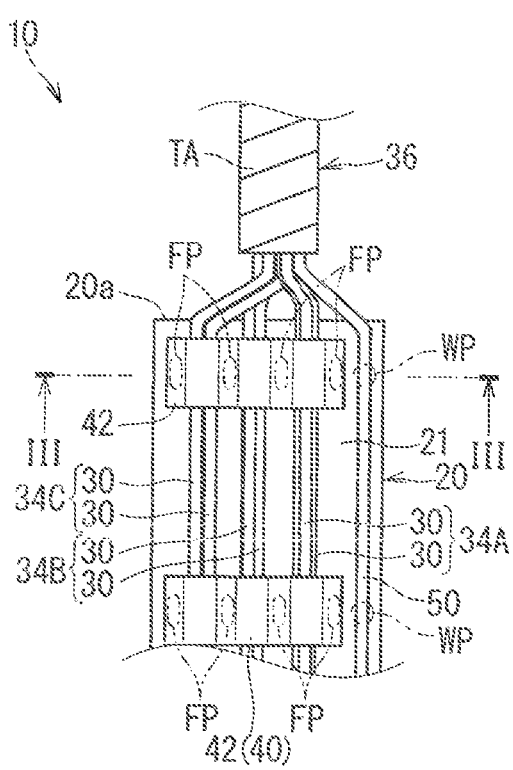
FIG. 2 is a partial enlarged view of FIG. 1.
Figure 3:
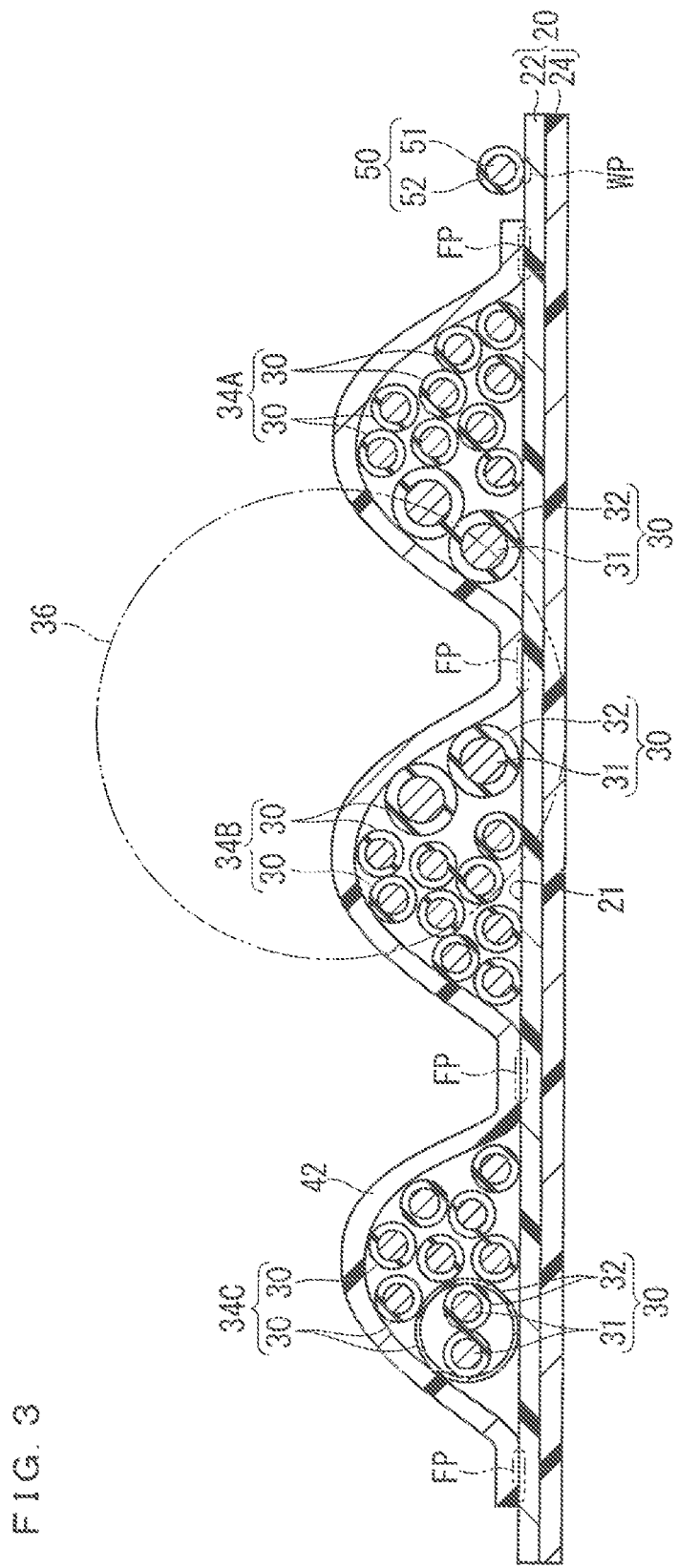
FIG. 3 is a cross-sectional view cut along a III-III line in FIG. 2.
Figure 4:
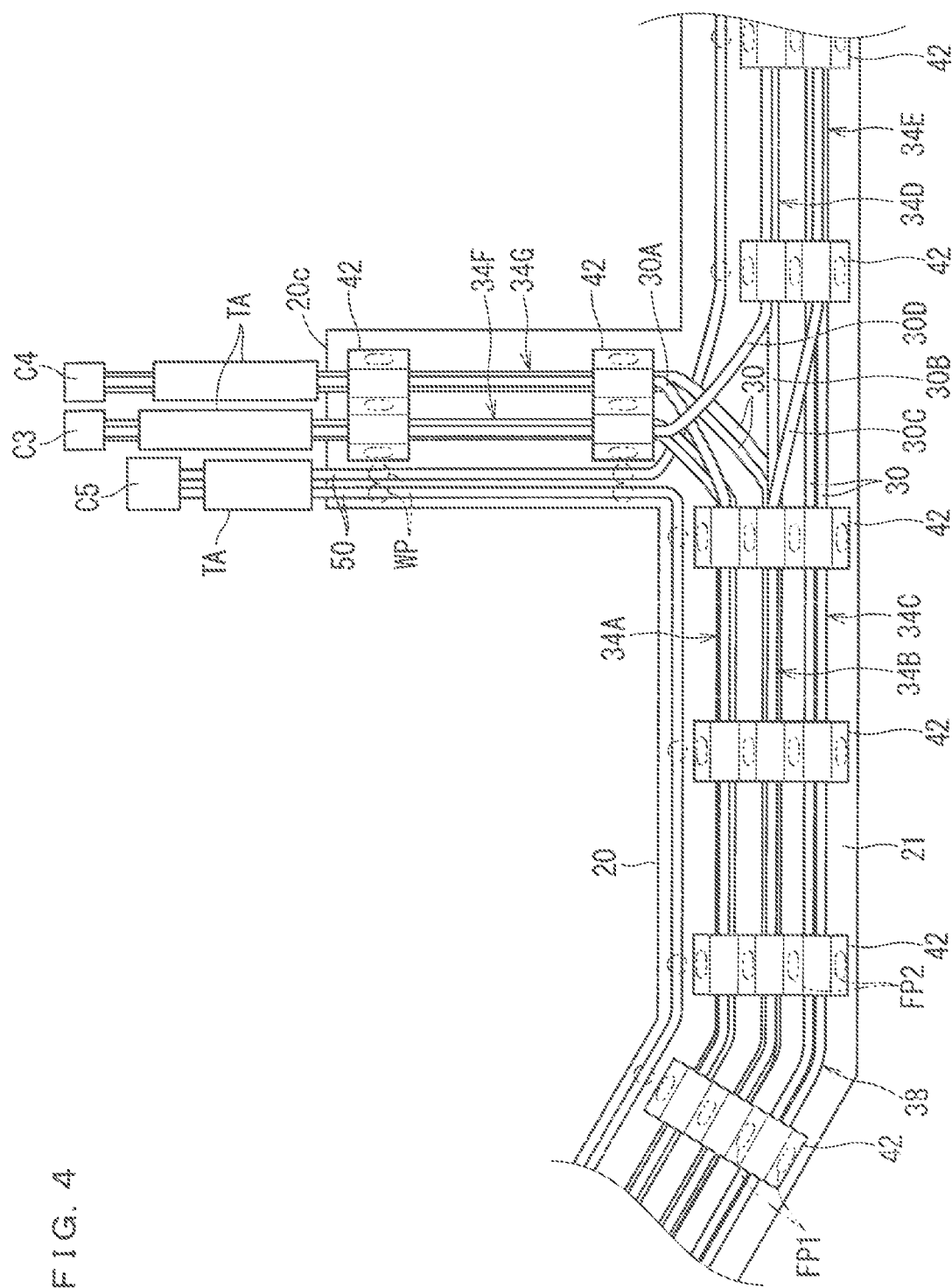
FIG. 4 is a partial enlarged view of FIG. 1.

A wiring member according to an embodiment 1 is described hereinafter. FIG. 1 is a schematic plan view illustrating a wiring member 10 according to the embodiment 1. FIG. 2 and FIG. 4 are partial enlarged views of FIG. 1. Portions different from each other are enlarged in FIG. 2 and FIG. 4. FIG. 3 is a cross-sectional view along a IV-IV line in FIG. 4.

The wiring member 10 includes a base member 20, a plurality of electrical wires 30, and a cover member 40. Herein, the wiring member 10 further includes a wire-like transmission member 50. The electrical wire 30 and the wire-like transmission member 50 are fixed to the base member 20. A fixing state of the electrical wire 30 to the base member 20 is different from that of the wire-like transmission member 50 to the base member 20. The electrical wire 30 is an example of a first wire-like transmission member, and the wire-like transmission member 50 is an example of a second wire-like transmission member.

The electrical wire 30 and the wire-like transmission member 50 are disposed on at least one surface of the base member 20. A surface of the base member 20 where the electrical wire 30 and the wire-like transmission member 50 are disposed is an arrangement surface 21. Herein, one surface of the base member 20 is the arrangement surface 21. The base member 20 may have any shape and structure. Described herein is an example that the base member 20 is formed into a sheet-like shape.

Herein, the base member 20 is formed into a shape along a route of the electrical wire 30 and the wire-like transmission member 50. Specifically, the base member 20 includes a bended portion in accordance with a bended route of the electrical wire 30 and the wire-like transmission member 50. The base member 20 includes a portion branched in accordance with a branched route of the electrical wire 30 and the wire-like transmission member 50. The base member 20 may be formed into one large quadrangular shape, for example.

Herein, the base member 20 has a double layer structure of a first layer 22 and a second layer 24. The base member 20 may have a single layer structure, or may also have a three or more layer structure.

One surface of the first layer 22 is the arrangement surface 21 of the base member 20. The electrical wire 30 and the wire-like transmission member 50 are fixed to the first layer 22. Herein, the first layer 22 is a base member side fusion layer. The fusion layer includes a resin material, or preferably includes a thermoplastic resin material. The resin material of the fusion layer is softened and fused to a fusion target. A type of the resin material is not particularly limited, but polyvinyl chloride (PVC), polyethylene (PE), polypropylene (PP), or polyethylene terephthalate (PET) can be adopted, for example.

A structure of the first layer 22 is not particularly limited. For example, the first layer 22 may be a sheet having an evenly filled cross-sectional surface (also referred to as a non-foam sheet or a solid sheet, for example). The first layer 22 is also considered a foam sheet, for example. The first layer 22 is also considered a fibrous material sheet such as a braided cloth, a woven cloth, or a non-woven cloth, for example.

The second layer 24 is formed of a material different from that of the first layer 22, or has a different structure. The second layer 24 increases a function of the first layer 22 or adds a function which the first layer 22 does not have to the base member 20. A material constituting the second layer 24 is a material described for the first layer 22 described above or metal, for example. A structure of the second layer 24 may be any of the structure described for the first layer 22 described above. One surface of the second layer 24 is a main surface on a side opposite side of the arrangement surface 21 of the base member 20.

The first layer 22 and the second layer 24 are fixed to each other while the other surface of the first layer 22 and the other surface of the second layer 24 have contact with each other. A fixing state of the first layer 22 and the second layer 24 is not particularly limited, however, fixing by fusion or adhesion is preferable. For example, when at least one of the first layer 22 and the second layer 24 is a sheet having voids in a surface such as a fibrous material sheet or a foam sheet, a resin material or an adhesive agent enters the voids and the layers can be fixed to each other. Such a configuration causes so-called anchor effect, thus the first layer 22 and the second layer 24 are rigidly fixed.

In the description herein, the first layer 22 is a solid sheet made of resin and the second layer 24 is a fibrous material sheet. In the description herein, the first layer 22 and the second layer 24 are fused to each other. That is to say, the resin of the first layer 22 enters between the fibers of the second layer 24 while having flowability, and is then hardened. Maintained accordingly is a state where the resin of the first layer 22 enters between the fibers of the second layer 24, and the first layer 22 and the second layer 24 are rigidly fixed to each other.

The first layer 22 and the second layer 24 are formed to have the same size (the same planar shape). One of the first layer 22 and the second layer 24 may also be formed to be larger than the other one thereof. The first layer 22 and the second layer 24 are wholly fixed at a region where they have contact with each other. The first layer 22 and the second layer 24 may also be fixed only at a part of a region where they have contact with each other.

The base member 20 may be a flexible member. For example, the first layer 22 is a resin layer having an evenly filled cross-sectional surface made up of flexible resin such as flexible PVC as a material, the second layer 24 is a non-woven cloth made up of PET as a material, and the base member 20 is a flexible member. For example, the base member 20 may have a plastic property so as to be able to follow bending of the electrical wire 30 and the wire-like transmission member 50. It is also applicable that the wiring member 10 can be bended in a thickness direction (bending so that a fold line follows a main surface of the sheet 20) in a portion where the base member 20 is provided. The base member 20 may be a member which cannot be curved in the thickness direction. The base member 20 may be a member which is not broken but can be beaded at a time of being beaded in the thickness direction. The base member 20 may be a member which cannot be beaded but is broken at a time of being beaded in the thickness direction. The base member 20 may have rigidity not capable of following bending of the electrical wire.

The electrical wire 30 is a wire-like member transmitting an electrical power. The wire-like transmission member 50 is a wire-like member transmitting an electrical power or light, for example. The electrical wire 30 includes a base member arrangement section and a non-base member arrangement section. The base member arrangement section is a section of the electrical wire 30 disposed on the base member 20. The base member arrangement section is a section of the electrical wire 30 located on the arrangement surface 21. The non-base member arrangement section is a section of the electrical wire 30 which is not disposed on the base member 20. The non-base member arrangement section is a section of the electrical wire 30 located on an outer side of the arrangement surface 21. The base member arrangement section and the non-base member arrangement section may be provided in any position in the electrical wire 30. Herein, an intermediate portion of the electrical wire 30 is the base member arrangement section and an end portion of the electrical wire 30 is the non-base member arrangement section. The intermediate portion of the electrical wire 30 may be the base member arrangement section. The end portion of the electrical wire 30 may be the base member arrangement section. Herein, the base member arrangement section may be provided between two non-base member arrangement sections. The non-base member arrangement section may be provided between two base member arrangement sections. It is sufficient that at least one base member arrangement section and at least one non-base member arrangement section may be provided. The base member 20 is formed into a flat shape as a whole. The plurality of electrical wires 30 and the plurality of wire-like transmission members 50 are fixed to the base member 20, thus the wiring member 10 is kept in a flat state in the base member arrangement section.

The plurality of electrical wires 30 and the plurality of wire-like transmission members 50 are assumed to be members connecting components in a vehicle. A connector C, for example, is provided on end portions of the electrical wire 30 the wire-like transmission member 50. This connector C is connected to a connector provided in the other side component, thus the electrical wire 30 and the wire-like transmission member 50 are connected to the other side component. That is to say, the present wiring member 10 is used as the wiring member 10 electrically connecting various types of component in a vehicle, for example (or connecting them so that they can perform optical communication). The connector C may be fixed to the base member 20.

Routes of the plurality of electrical wires 30 and the plurality of wire-like transmission members 50 are set in accordance with a position of a component to which they are connected. The plurality of electrical wires 30 and the plurality of wire-like transmission members 50 are fixed to the base member 20, thus the plurality of electrical wires 30 and the plurality of wire-like transmission members 50 are kept in a form following a wiring route corresponding to a position of a component as a connection destination of each of the plurality of electrical wires 30 and the plurality of wire-like transmission members 50 in the base member arrangement section. The plurality of electrical wires 30 and the plurality of wire-like transmission members 50 may be fixed to the base member 20 in a state where a branch wire is branched from a main wire. The base member 20 may also be formed into a shape in which a portion to which the branch wire is fixed is branched from a portion to which the main wire is fixed. Herein, the plurality of electrical wires 30 and the plurality of wire-like transmission members 50 are branched on the base member 20.

The plurality of electrical wires 30 are divided into a plurality of electrical wire bundles 34 and parallelly arranged in the base member arrangement section. Each electrical wire bundle 34 is made up of a collection of two or more electrical wires 30 in the plurality of electrical wires 30. Herein, three electrical wire bundles 34A, 3414, and 34C parallelly extend in a first direction from a branch region. Two electrical wire bundles 34D and 34E parallelly extend in a second direction from the branch region. Two electrical wire bundles 34F and 34G parallelly extend in a third direction from the branch region. Any number is applicable as the number of the electrical wire bundles 34 parallelly extending in the first, second, and third directions from the branch region, and the number there can be appropriately set. When the number of the electrical wire bundles 34 increases, a height dimension of the wiring member 10 can be reduced, for example. When the number of the electrical wire bundles 34 decreases, a width dimension of the wiring member 10 can be reduced, for example. The electrical wire bundle 34 is an example of a wire-like transmission member bundle. Optional two of the electrical wire bundles 34 described above can be the first wire-like transmission member bundle and the second wire-like transmission member bundle. The first wire-like transmission member bundle and the second wire-like transmission member bundle are preferably optional two of a combination of the electrical wire bundles 34 parallelly arranged in the above description.

The three electrical wire bundles 34A, 34B, and 34C extend from the base member arrangement section to the non-base member arrangement section while being divided into three bundles, and are collected in the non-base member arrangement section. A large bundle part 36 made up of three electrical wire bundles 34A, 34B, and 34C bundled together is provided in the non-base member arrangement section. The large bundle part 36 is bundled by a banding member such as an adhesive tape TA or a banding band. The large bundle part 36 may be housed and bundled in an external member such as a corrugate tube or a protector. The plurality of electrical wires 30 include a portion extending as the large bundle part 36 in the non-base member arrangement section and a portion extending to be branched into the three electrical wire bundles 34A, 34B, and 34C on an arrangement surface in the base member arrangement section. The plurality of electrical wires 30 constituting the large bundle part 36 is connected to one connector C1 in one end side of the large bundle part 36. The plurality of electrical wires 30 constituting the large bundle part 36 may be branched in one end side of the large bundle part 36 to be connected to a plurality of connectors.

Herein, a portion transitioning from the three electrical wire bundles 34A, 34B, and 34C to the large bundle part 36 is provided in the non-base member arrangement section. The three electrical wire bundles 34A, 34B, and 34C extend from an end portion 20a of the base member 20 to the non-base member arrangement section while being divided into three bundles, and are connected to one connector C1. The portion transitioning from the three electrical wire bundles 34A, 34B, and 34C to the large bundle part 36 may be provided in the base member arrangement section. Exemplified as the transitioning portion is a portion transitioning from the three electrical wire bundles 34A, 34B, and 34C to the large bundle part 36 as described above, however, for example, the transitioning portion may be considered to include a portion ranging from the three electrical wire bundles 34A, 34B, and 34C to a position reduced to be smallest in a width direction by the large bundle part. The transitioning portion may also be considered to include a portion ranging from the three electrical wire bundles 34A, 34B, and 34C to a position increased to be largest in a height direction by the large bundle part.

The two electrical wire bundles 34D and 34E extend from an end portion 20b of the base member 20 to the non-base member arrangement section while being divided into two bundles, and are connected to one connector C2. Two electrical wire bundles 34I) and 34E do not constitute the large bundle part in the non-base member arrangement section. The electrical wire 30 constituting the electrical wire bundle 34D is not bundled by the adhesive tape TA, for example, in the non-base member arrangement section. The electrical wire 30 constituting the electrical wire bundle 34E is not bundled by the adhesive tape IA, for example, in the non-base member arrangement section.

The two electrical wire bundles 34F and 340 extend from an end portion 20c of the base member 20 to the non-base member arrangement section while being divided into two bundles, and are connected to the other connectors C3 and C4, respectively. Two electrical wire bundles 34D and 34E do not constitute the large bundle part in the non-base member arrangement section. The electrical wire 30 constituting the electrical wire bundle 34F is bundled by the adhesive tape TA, for example, in the non-base member arrangement section. The electrical wire 30 constituting the electrical wire bundle 340 is bundled by the adhesive tape TA, for example, in the non-base member arrangement section.

A portion where the plurality of electrical wire bundles 34 are parallelly arranged in the base member arrangement section is referred to as a parallel route part in some cases. Provided herein are three parallel route parts of a parallel route part made up of the three electrical wire bundles 34A, 34B, and 34C, a parallel route part made up of the two electrical wire bundles 34D and 34E, and a parallel route part made up of the two electrical wire bundles 34F and 34G. Three parallel route parts need not be provided, however, the number of the parallel route parts may be one or two, or four or more parallel route parts are also applicable. It is sufficient that at least one parallel route part is provided. For example, when the plurality of electrical wires 30 are not branched on the base member 20, the number of the parallel route parts is one. For example, even when the plurality of electrical wires 30 are branched on the base member 20, the number of the parallel route parts may be one. For example, in FIG. 1, when only one electrical wire bundle extends in each of the second and third directions from the branch region in place of two electrical wire bundles 34D, 34E, 34F, and 34G, the number of the parallel route parts is one parallel route part made up of the three electrical wire bundles 34A, 34B, and 34C.

The large bundle part 36 is provided in one of the three parallel route parts. The large bundle part 36 may be provided in the plurality of parallel route parts. The large bundle part 36 is preferably provided in the parallel route part which becomes thickest when it is bundled together in the plurality of parallel route parts. The thickest large bundle part 36 serves as the parallel route part on the base member 20, thus the height dimension of the wiring member 10 on the base member 20 can be suppressed.

The electrical wire 30 includes a core wire 31 and an insulating covering 32. The insulating covering 32 is a covering layer located on an outermost side of the electrical wire 30. The wire-like transmission member 50 includes a transmission wire body 51 and a covering layer 52. The covering layer 52 is a layer located on an outermost side of the wire-like transmission member 50. For example, the wire-like transmission member 50 may be a general wire having a core wire and a covering layer around the core wire, or may also be a shield wire, a twisted wire, an enamel wire, a nichrome wire, or an optical fiber. The transmission wire body transmits an electrical power or light, for example. The transmission wire body corresponds to a core wire in a covering electrical wire, and corresponds to a core and a clad in an optical fiber cable.

The electrical wire 30 and the wire-like transmission member 50 transmitting the electrical power may be various kinds of signal wires or various kinds of power wires. Some of the electrical wires 30 and the wire-like transmission members 50 transmitting the electrical power may be used as an antenna or coil, for example, transmitting or receiving a signal or electrical power to or from a space.

The electrical wire 30 and the wire-like transmission member 50 may be a single wire-like object or a composite object of a plurality of wire-like objects (a twisted wire and a cable made up of a plurality of wire-like objects covered by a sheath).

The cover member 40 is used for fixing the electrical wire 30 to the base member 20. The wire-like transmission member 50 is fixed to the base member 20 without intervention of the cover member 40.

The cover member 40 covers the plurality of electrical wire bundles 34. The cover member 40 is fixed to the arrangement surface 21. The cover member 40 is fixed to the arrangement surface 21 at positions on both sides of the plurality of electrical wire bundles 34 and a position between the positions on the both sides. The electrical wire bundle 34 is sandwiched between the base member 20 and the cover member 40. An annular part surrounding the electrical wire bundle 34 is formed by the base member 20 and the cover member 40. The electrical wire bundle 34 passes through an inner space of the annular part. The base member 20 and the cover member 40 are fixed on both lateral sides of the electrical wire bundle 34. Accordingly, the electrical wire bundle 34 is fixed to the base member 20 via the cover member 40.

A portion where the base member 20 and the cover member 40 are fixed is a fixing part FP. Three or more fixing parts FP are provided at intervals along a parallel direction of the electrical wire bundle 34. The fixing part FP may be wholly and continuously provided along the extension direction of the electrical wire bundle 34. Herein, the plurality of fixing parts FP are provided at intervals along the extension direction of the electrical wire bundle 34.

Any fixing state may be applied as a fixing state of the base member 20 and the cover member 40. Applicable as the fixing state are a contact area fixation and a non-contact area fixation, or both fixations may be used together. Herein, the contact area fixation indicates that a portion where the base member 20 and the cover member 40 have contact with each other is stuck and fixed. The non-contact area fixation is a fixing state which is not the contact area fixation, and indicates that a sewing thread, a cover, or an adhesive tape presses the cover member 40 toward the base member 20 or sandwiches the base member 20 and the cover member 40 to keep them in a fixing state, for example. In the description hereinafter, the base member 20 and the cover member 40 are in the state of the contact area fixation.

Applicable as the configuration of the contact area fixation are a contact area indirect fixation and a contact area direct fixation, or both fixations may also be used together in different regions. Herein, the contact area indirect fixation indicates that the base member 20 and the cover member 40 are indirectly stuck and fixed via an adhesive agent, a gluing agent, and a double-sided adhesive tape provided therebetween. The contact area direct fixation indicates that the base member 20 and the cover member 40 are directly stuck and fixed without an intervention of the adhesive agent, for example, which is separately provided. Considered in the contact area direct fixation is that resin included in at least one of the base member 20 and the cover member 40 is melted, thus the base member 20 and the cover member 40 are stuck and fixed, for example.

In forming the state of such a contact area direct fixation, the resin is considered to be melted by heat or a solvent, for example. That is to say, the state of the contact area direct fixation may be the state of the contact area direct fixation by the heat or the state of the contact area direct fixation by the solvent. The contact area direct fixation by the heat is preferable.

At this time, a means of forming the state of the contact area direct fixation is not particularly limited, but a known means such as welding, fusion, and melting joint can be used. Herein, the base member 20 and the cover member 40 are fused and directly fixed to each other. The cover member 40 includes a cover member side fusion layer.

The cover member side fusion layer is fused to the base member side fusion layer. A material and structure described above for the base member side fusion layer can be adopted as a material and structure of the cover member side fusion layer. The cover member 40 may have a single layer structure or a multilayer structure made up of a plurality of stacked layers. When the cover member 40 has a multilayer structure, the cover member side fusion layer preferably appears in one main surface of the cover member 40. The cover member 40 may have the same structure as the base member 20, or may also have a different structure. When the cover member 40 has a structure different from the base member 20, the structure of the cover member 40 is not particularly limited, but can be appropriately set. For example, a thickness of the cover member 40 may be the same as that of the base member 20, a thickness of the cover member 40 may be larger than that of the base member 20, or a thickness of the base member 20 may be larger than that of the cover member 40.

Herein, the cover member 40 has a structure different from the base member 20. Herein, the cover member 40 has a single layer structure made up of only the cover member side fusion layer. Accordingly, one main surface of the cover member side fusion layer constitutes one main surface of the cover member 40, and the other main surface of the cover member side fusion layer constitutes the other main surface of the cover member 40.

A size of the cover member 40 is not particularly limited, however, the cover member 40 is preferably formed to be smaller than the base member 20. The cover member 40 is preferably formed so that a dimension thereof in at least one of the extension direction and the width direction of the base member 20 is smaller than that of the base member 20. Herein, the cover member 40 includes a plurality of band sheets 42.

Each band sheet 42 is formed so that dimensions thereof in both the extension direction and the width direction of the base member 20 are smaller than that of the base member 20. Each band sheet 42 is formed to have a smaller length than the electrical wire bundle 34 along the extension direction of the electrical wire bundle 34. Each band sheet 42 covers a part of the electrical wire bundle 34 along the extension direction. The plurality of band sheets 42 are provided at intervals along the extension direction of the electrical wire bundle 34. Each band sheet 42 covers the plurality of electrical wire bundles 34 disposed in those positions. The fixing parts are provided in positions on both sides of the plurality of electrical wire bundles 34 and a position between the both sides in each band sheet 42. The fixing parts FP are provided in each band sheet 42, thus the plurality of fixing parts FP are provided at intervals along the extension direction of the electrical wire bundle 34.

The electrical wire bundle 34 includes a bending part 38 disposed along a bended route in the base member arrangement section. An angle of the bending part 38 is not particularly limited, but can be appropriately set. When an angle in a straight part is 180 degrees, the angle of the bending part 38 is 150 degrees, for example. The angle of the bending part 38 preferably has any value ranging from 90 degrees to 150 degrees.

The cover member 40 is fixed to the base member 20 in positions on both sides of the bending part 38. Herein, the electrical wire bundle 34 is not directly joined to the base member 20 and the cover member 40. Thus, the electrical wire bundle 34 can be moved along the extension direction with respect to the base member 20 and the cover member 40. The cover member 40 is fixed to the base member 20 in positions on both sides of the bending part 38, thus the movement of the electrical wire bundle 34 in the extension direction is suppressed. The positions on both sides of the bending part 38 are positions adjacent to a portion where bending is started and a portion where bending is finished. That is to say, bending of the electrical wire bundle 34 starts at a position adjacent to a side of the other fixing part FP2 with respect to one fixing part FP1, and finishes at a position adjacent to a side of one fixing part FP1 with respect to the other fixing part FP2.

That is to say, the electrical wire bundle 34 extends on one side of the bending part 38 along the first direction, and extends on the other side of the bending part 38 along the second direction. The first direction and the second direction are directions intersecting with each other. A band sheet 42A is provided in a position adjacent to one side of the bending part 38. A band sheet 42B is provided in a position adjacent to the other side of the bending part 38. When a portion of the electrical wire bundle 34 located on one side of the bending part 38 is pulled to a side of an end portion along the first direction and the electrical wire bundle 34 is moved, the electrical wire bundle 34 interferes in at least one of the band sheets 42A and 42B, thus the movement thereof is suppressed. In the similar manner, when a portion of the electrical wire bundle 34 located on the other side of the bending part 38 is pulled to a side of an end portion along the second direction and the electrical wire bundle 34 is moved, the electrical wire bundle 34 interferes in at least one of the band sheets 42A and 42B, thus the movement thereof is suppressed.

Only one branch region is provided herein. The branch region is a region where some electrical wire is branched from the other some electrical wire. The plurality of branch regions may be provided.

A shift region is provided between the plurality of fixing parts FP. The shift region is a region where at least one of the plurality of electrical wires 30 changes the electrical wire bundle 34 to which the at least one of the plurality of electrical wires 30 belongs. The wiring member 10 is provided with one shift region herein. The wiring member 10 may be provided with the plurality of shift regions.

The shift region is provided in the branch region. The shift region provided in the branch region is referred to as a branch shift region. Some of the plurality of electrical wires 30 belonging to one electrical wire bundle 34 changes the electrical wire bundle 34 to be branched from the other some of the plurality of electrical wires 30 in the branch shift region. It is also applicable that some electrical wire 30 in the electrical wire bundle is not branched in the branch region but the electrical wire bundles 34 are branched from each other. In this case, the branch region is not considered the branch shift region.

The shift region may include a parallel shift region provided in a parallel region. For example, it is also applicable that the electrical wire 30 in any of the three electrical wire bundles 34A, 34B, and 34C parallelly arranged is moved to the other electrical wire bundle 34 to constitute the parallel shift region between the band sheet 42A and the band sheet 42B.

Two or more electrical wires 30 change the electrical wire bundles 34 to which the two or more electrical wires 30 belong, respectively, in one shift region. One branch shift region is provided herein. The plurality of electrical wires 30 change the electrical wire bundles 34 to which the plurality of electrical wires 30 belong, respectively, in one branch shift region.

A combination of the electrical wires 30 changing the electrical wire bundles 34 to which the electrical wires 30 belong, respectively, in one shift region is referred to as a shift wire pair. Herein, the shift wire pair includes a parallel shift wire pair and a branch shift wire pair. The parallel shift wire pair is a combination of the electrical wires 30 which are not branched but parallelly extend after passing through the shift region and changes the electrical wire bundle 34. The parallel shift wire pair may occur in both the branch shift region and the parallel shift region. The branch shift wire pair is a combination of the electrical wires 30 changing the electrical wire bundle 34 in accordance with branching after passing through the branch shift region. The branch shift wire pair cannot occur in the parallel shift region.

Specifically, in the example illustrated in FIG. 4, the electrical wire 30A extends to the electrical wire bundle 34G through the branch shift region, and the other electrical wire 30 extends to the electrical wire bundle 34F based on the electrical wire bundle 34A. Thus, the electrical wire 30A and the other electrical wire 30 are the parallel shift wire pair based on the electrical wire bundle 34A.

The electrical wire 30B extends to the electrical wire bundle 34D through the shift region, the electrical wire 30C extends to the electrical wire bundle 34E, and the other electrical wire 30 extends to the electrical wire bundle 34G based on the electrical wire bundle 34B. Thus, the electrical wires 30B and 30C are the parallel shift wire pair based on the electrical wire bundle 34B. The electrical wires 30B and 30C and the other electrical wire 30 are the branch shift wire pair.

The electrical wire 30B extends to the electrical wire bundle 34B through the branch shift region and the electrical wire 30D extends to the electrical wire bundle 34F based on the electrical wire bundle 34D. Thus, the electrical wires 30B and 30D are the branch shift wire pair based on the electrical wire bundle 34D.

The electrical wire 30C extends to the electrical wire bundle 34B through the branch shift region and the other electrical wire 30 extends to the electrical wire bundle 34C based on the electrical wire bundle 34E. Thus, the electrical wire 30C and the other electrical wire 30 are the parallel shift wire pair based on the electrical wire bundle 34E.

The electrical wire 30D extends to the electrical wire bundle 34D through the branch shift region and the other electrical wire 30 extends to the electrical wire bundle 34A based on the electrical wire bundle 34F. Thus, the electrical wires 30D and the other electrical wire 30 are the branch shift wire pair based on the electrical wire bundle 34F.

The electrical wire 30A extends to the electrical wire bundle 34A through the branch shift region and the other electrical wire 30 extends to the electrical wire bundle 34B based on the electrical wire bundle 34G. Thus, the electrical wire 30A and the other electrical wire 30 are the parallel shift wire pair based on the electrical wire bundle 34G.

There is no shift wire pair based on the electrical wire bundle 34C.

The wire-like transmission member 50 is disposed in the base member arrangement section. The covering layer of the wire-like transmission member 50 is fused to the arrangement surface 21. A portion where the wire-like transmission member 50 and the arrangement surface 21 are fused to each other is referred to as a fusion part WP. A resin material constituting the first layer 22 and a resin material constituting the covering layer 52 are the same type of material.

Herein, the wire-like transmission member 50 is fused to the base member 20 at a plurality of positions at intervals along the extension direction. The wire-like transmission member 50 may be wholly and sequentially fixed to the base member 20 along the extension direction.

Herein, the fixing part FP and the fusion part WP are provided in the same position along the extension direction in the section where the electrical wire bundle 34 and the wire-like transmission member 50 are parallelly arranged. However, the fixing part FP and the fusion part VIP may be provided in positions different from each other along the extension direction in the section where the electrical wire bundle 34 and the wire-like transmission member 50 are parallelly arranged.

The plurality of (herein, two) wire-like transmission members 50 are included. Only one or three or more wire-like transmission members 50 may be included. When the wiring member 10 includes the wire-like transmission member 50, it is sufficient that at least one wire-like transmission member 50 is included. The wire-like transmission member 50 may be omitted. As illustrated in FIG. 2, the wire-like transmission member 50 extending to an outer side of the base member 20 together with the plurality of electrical wire bundles 34A, 34B, and 34C is bundled into the large bundle part 36. The wire-like transmission member 50 extending to the outer side of the base member 20 together with the plurality of electrical wire bundles 34A, 34B, and 34C needs not be bundled into the large bundle part 36.

Herein, the number of the wire-like transmission members 50 is smaller than that of the electrical wire bundles 34. The number of the wire-like transmission members 50 may be equal to or larger than that of the electrical wire bundles 34. Herein, the wire-like transmission member 50 is located on an outermost side along the parallel direction of the plurality of electrical wire bundles 34. The wire-like transmission member 50 is located on the outer side of the plurality of electrical wire bundles 34. The wire-like transmission member 50 may be located between the plurality of electrical wire bundles 34.

Two wire-like transmission members 50 are parallelly arranged in a part of the route, and are branched in the branch region to extend in directions different from each other. The wire-like transmission member 50 may include the wire-like transmission member 50 wholly arranged parallelly on the base member 20. The wire-like transmission member 50 may include the wire-like transmission member 50 which is not wholly arranged parallelly on the base member 20. One end portions of two wire-like transmission members 50 are connected to a connector C5 different from the connectors C3 and C4 to which the electrical wire 30 is connected. The other end portions of two wire-like transmission members 50 are connected to the connectors C1 and C2 to which the electrical wire 30 is connected. However, both one end portions and the other end portions of the wire-like transmission members 50 may be connected to a connector different from a connector to which the electrical wire 30 is connected, or may also be connected to the same connector.

The plurality of electrical wires 30 include an electrical wire (referred to as a different type of wire hereinafter) having the insulating covering 32 formed by a material different from a material constituting the arrangement surface 21. A resin material constituting the insulating covering 32 of the different type of wire is different from a resin material constituting the first layer 22 and a resin material constituting the covering layer 52.

For example, a resin material constituting the first layer 22 and a resin material constituting the covering layer 52 are PVC, and a material constituting the insulating covering 32 of the different type of wire is a resin material different from PVC. In this case, the material constituting the insulating covering 32 of the different type of wire is not particularly limited except for PVC, thus polyolefin such as PE and PP, silicone resin, or fluorine resin such as polytetrafluoroethylene, for example, is also applicable.

The resin material may be halogen-free. A halogen-free state indicates that chlorine and bromine in halogen are not contained or only a trace amount of halogen is contained. For example, in a standard of International Electrotechnical Commission (IEC), a case where a content rate of each of chlorine and bromine is equal to or smaller than 900 ppm and a total content rate of chlorine and bromine is equal to or smaller than 1500 ppm is defined as the halogen-free state. A halogen-free wire-like transmission member is also referred to as a zero-halogen wire (for example, a zero-halogen electrical wire in a case of an electrical wire).

A combination of materials constituting the first layer 22, the insulating covering 32 of the different type of wire, and the covering layer 52 is not limited thereto described above. For example, a resin material constituting the first layer 22 and a resin material constituting the covering layer 52 are PE, and a material constituting the insulating covering 32 of the different type of wire may be a resin material different from PE.

When the base member side fusion layer is fused to the cover member side fusion layer and the insulating covering 32 of the different type of wire in the same condition, fusion strength between the base member side fusion layer and the cover member side fusion layer is larger than that between the base member side fusion layer and the insulating covering 32 of the different type of wire. The resin material constituting the base member side fusion layer is different from that constituting the insulating covering 32 of the different type of wire, and is the same as that constituting the cover member side fusion layer, thus fusion strength between the base member side fusion layer and the cover member side fusion layer tends to be larger than fusion strength between the base member side fusion layer and the insulating covering 32 of the different type of wire. Herein, the fusion strength in the present specification can be evaluated using results separately tested in the same type of detachment test (for example, each test of JIS K6854), for example.

A means of forming the fusion state is not particularly limited. Adoptable are various types of fusion means such as ultrasonic fusion, heating pressurizing fusion, hot air fusion, and high-frequency fusion. When the fusion state is formed by these means, the base member 20, the cover member 40, and the wire-like transmission member 50 are in a state of fusion fixation by those means. Specifically, when the base member 20, the cover member 40, and the wire-like transmission member 50 are fused by ultrasonic fusion, the fixing part FP and the fusion part WP are ultrasonic fusion parts, for example.

In each band sheet 42, when the wiring member 10 is observed along the extension direction as illustrated in FIG. 4, a part of the cover member side fusion layer along the extension direction of the electrical wires 30 is fused to the base member side fusion layer. That is to say, each band sheet 42 is not wholly fused to the base member along the extension direction of the electrical wires 30. Each band sheet 42 includes a portion which is not fused to the base member side fusion layer in a part thereof along the extension direction of the electrical wires 30.

Effect Etc. Of Embodiment 1

According to the wiring member 10 having the above configuration, the plurality of electrical wires 30 extend as the large bundle part 36 in the non-base member arrangement section, and extend while being divided into the plurality of electrical wire bundles 34 in the base member arrangement section. Thus, the height dimension of the wiring member 10 can be suppressed in the base member arrangement section. For example, as illustrated in FIG. 3, a height dimension of a portion where the plurality of electrical wire bundles 34A, 34B, and 34C are provided can be smaller than a height dimension of the large bundle part 36 made up of the electrical wire bundles 34A, 34B, and 34C bundled together. The cover member 40 is fixed to the arrangement surface 21 in the positions on both sides of the plurality of electrical wire bundles 34 and the position between the both sides, thus suppressed is that the wiring member 10 has an unintended height dimension due to a condition that the wire-like transmission members of each electrical wire bundle 34 are mixed. Accordingly, the height dimension of the wiring member 10 on the base member 20 can be suppressed in the wiring member 10 in which the electrical wire bundle 34 is disposed on the base member 20.

Some electrical wire 30 changes the electrical wire bundle 34 in the shift region between the plurality of fixing parts FP at intervals along the extension direction of the electrical wire bundle 34. Accordingly, when the electrical wires 30 are divided into the plurality of electrical wire bundle 34 from the large bundle part 36, the electrical wire bundle 34 needs not be set for each route. Accordingly, the number of the electrical wire bundles 34 and a thickness of each electrical wire bundle 34 can be appropriately set easily, for example. For example, a thickness of each of the plurality of electrical wire bundles 34 can be equalized or a thickness of a specific electrical wire bundle 34 can be changed in accordance with a space of a vehicle in a certain section.

Two or more electrical wires 30 change the electrical wire bundles 34 to which the two or more electrical wires 30 belong, respectively, in one shift region. Accordingly, a wide dispersion of the shift region on the base member 20 can be suppressed.

The cover member 40 is fixed to the base member 20 in positions on both sides of the bending part 38. Accordingly, when the electrical wire 30 is pulled toward an outer side of the base member 20, suppressed is a positional deviation of the electrical wire 30 and the base member 20 along the extension direction of the electrical wire 30.

The base member 20 and the cover member 40 are fused and fixed to each other. Accordingly, a member for fixing the cover member 40 and the base member 20 can be omitted in the wiring member 10.

The plurality of electrical wires 30 include the wire-like transmission member having the insulating covering 32 formed by the material different from the material constituting the arrangement surface 21. Accordingly, the wire-like transmission member hardly fused to the arrangement surface 21 directly is held in the base member arrangement section by the cover member 40.

The covering layer of the wire-like transmission member 50 is fused to the arrangement surface 21. Accordingly, the wire-like transmission member 50 is directly fixed to the base member 20 without intervention of the other fixing member.

Each of the plurality of band sheets 42 is fixed to the base member 20 at the positions on both sides of the plurality of electrical wire bundles 34 and the position between the both sides. Accordingly, the cover member 40 needs not be provided in the whole base member 20.

The plurality of electrical wire bundles 34 extend to the outer side of the base member 20 from each of the plurality of end portions 20a, 20b, and 20c in the base member 20. Accordingly, the electrical wire 30 can be easily kept in the state of being divided into the plurality of electrical wire bundles 34 on the base member 20.

Modification Example

Figure 5:
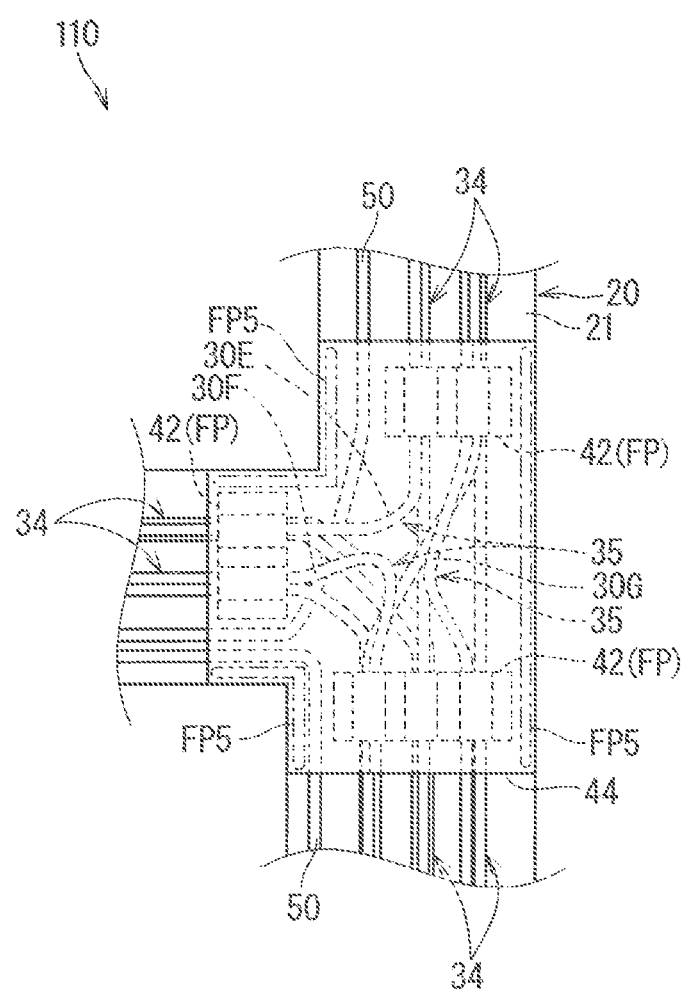
FIG. 5 is a plan view illustrating a modification example of the wiring member.

FIG. 5 is a plan view illustrating a modification example of the wiring member 10.

An extra length absorbing part absorbing an extra length of the electrical wire 30 is provided on the base member 20 in the wiring member 110 according to the modification example. The extra length absorbing part absorbs an extra length occurring by a tolerance of the electrical wire 30, for example. An extra length of each of the plurality of electrical wires 30 constituting one electrical wire bundle 34 can have a value different from each other. In this case, a magnitude of the extra length absorbed by the extra length absorbing part can be different between the electrical wires 30 constituting the same electrical wire bundle 34.

The extra length absorbing part includes a detour route part 35. The detour route part 35 is provided between two fixing parts FP. One of the two fixing parts FP is a first fixing part FP and the other one thereof is a second fixing part FP. The detour route part 35 is a portion in which the route of the electrical wire 30 extends along a roundabout route compared with a shortest route between the first fixing part FP and the second fixing part FP. Herein, the detour route part 35 is provided in the electrical wires 30E, 30F, and 30G. The detour route part 35 is provided in the bending part 38 in the electrical wires 30E and 30F.

Figure 6:
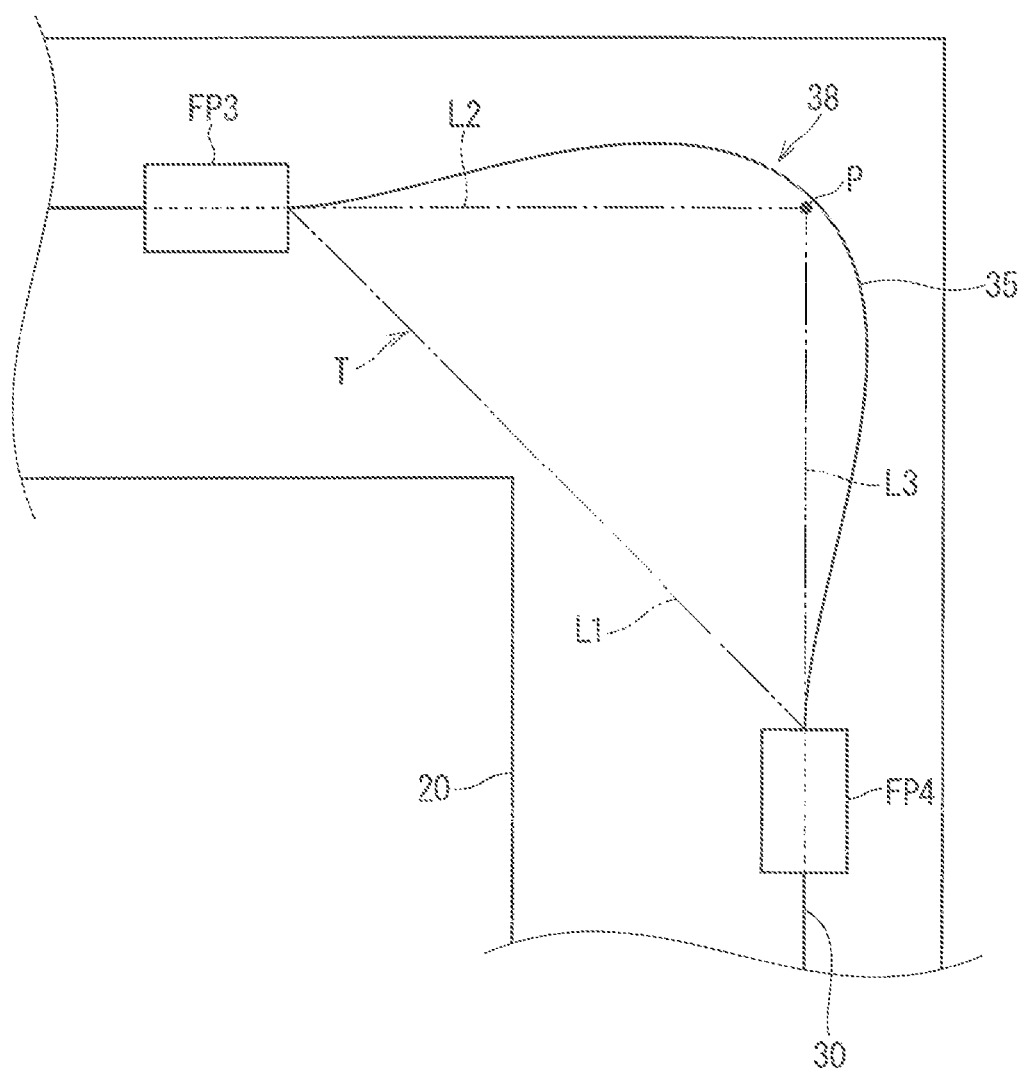
FIG. 6 is a conceptual diagram of a detour route part.

FIG. 6 is a conceptual diagram of the detour route part 3S in the bending part 38.

Fixing parts FP3 and FP4 provided on both sides of the bending part 38 in FIG. 6 are a first fixing part and a second fixing part. A segment L1 is a segment connecting the fixing part FP3 and the fixing part FP4. An intersection point P is an intersection point of a straight line extending from the fixing part FP3 along an extension direction to the intersection point P and a straight line extending from the fixing part FP4 along an extension direction to the intersection point P. A segment L2 is a segment connecting the fixing part FP3 and the intersection point P. A segment L3 is a segment connecting the fixing part FP4 and the intersection point P. Three segments are three sides of a triangle T.

A route of the electrical wire 30 extending along the segment L1 between the fixing part FP3 and the fixing part FP4 is a shortest route. The electrical wire 30 extends along a route expanding to an outer side than the segment L1, thereby forming the detour route part 35 as the route of the electrical wire 30. The route of the electrical wire 30 needs not expand to an outer side than the route along the segments L2 and L3. The route of the electrical wire 30 may be located inside the triangle T. The route of the electrical wire 30 may expand to an outer side than the route along the segments L2 and L3 to form the detour route part 35. The route of the electrical wire 30 may protrude to an outer side of the triangle T.

Returning to FIG. 5, the detour route part 35 is provided in the straight part in the electrical wire 30G. When the detour route part 35 is provided in the straight part, the route along the segments L2 and L3 in the above example coincides with the route along the segment L1. When the detour route part 35 is provided in the straight part, the electrical wire 30G meanders between the first fixing part FP and the second fixing part FP as illustrated in FIG. 5. At this time, the electrical wire 30G meanders so that one crest (trough) appears between the first fixing part FP and the second fixing part FP. The electrical wire 30G may meander so that a plurality of crests (troughs) appear between the first fixing part FP and the second fixing part FP.

The extra length absorbing part needs not be the detour route part 35. The extra length absorbing part may include a twisted part, for example. The twisted part is a portion where the electrical wire 30 constituting the electrical wire bundle 34 is twisted. The electrical wire 30 spirally extends and the extra length is absorbed in a portion of the electrical wire bundle 34 where the twisted part is formed. All of the electrical wires 30 constituting the electrical wire bundle 34 in a portion where the twisted part is formed may spirally extend. All of the electrical wires 30 constituting the electrical wire bundle 34 in a portion where the twisted part is formed needs not spirally extend, but some of the electrical wires 30 may spirally extend. When the electrical wire bundle 34 in which the twisted part is formed includes the electrical wire 30 having no extra length to be absorbed, the electrical wire 30 needs not be twisted. That is to say, it is also applicable that the electrical wire 30 having the extra length to be absorbed is wound around the electrical wire 30 having no extra length to be absorbed to constitute the twisted part in one electrical wire bundle 34.

One electrical wire bundle 34 may be provided with both the detour route part 35 and the twisted part. Both the detour route part 35 and the twisted pan may be provided between one group of the first fixing part FP and the second fixing part FP. For example, when the route of the electrical wire bundle 34 between two fixing parts FP is not the shortest route and the twisted part is formed in the electrical wire bundle 34 between the two fixing parts FP, it can be considered that both the detour route part 35 and the twisted part are provided between the two fixing parts FP. It is also applicable that the detour route part 35 is provided between one group of the first fixing part FP and the second fixing part FP, and the twisted part is provided between the other group of the first fixing part FP and the second fixing part FP. It is also applicable that one electrical wire bundle 34 is provided with the detour route part 35 and the other electrical wire bundle 34 is provided with the twisted part.

In the example illustrated in FIG. 5, the detour route part 35 is provided in the branch region. The detour route part 35 needs not be provided in the branch region, but may be provided in any position. In the example illustrated in FIG. 5, the detour route part 35 is set in the plurality of electrical wires 30E, 30F, and 30G. The plurality of electrical wires 30 need not be provided with the detour route part 35, however, only one electrical wire 30 may be provided with the detour route part 35. The detour route part 35 set in the plurality of electrical wires 30 is provided between one group of the first fixing part FP and the second fixing part FP. The detour route part 35 set in the plurality of electrical wires 30 needs not be provided between one group of the first fixing part FP and the second fixing part FP, but may also be dispersedly provided between plural groups of the first fixing part FP and the second fixing part FP.

The cover member 40 includes a cover part 44 in the wiring member 110. The cover part 44 is a portion covering the detour route part 35. Herein, the cover part 44 is a member different from the band sheet 42. The cover part 44 also covers two band sheets 42 provided with the detour route part 35 therebetween. Any material and rigidity may be applied to those of the cover part 44. The cover part 44 may be the base member 20 having higher rigidity than the band sheet 42.

The cover part 44 covers the branch region herein. The cover part 44 is formed into a shape corresponding to the branch portion of the base member 20.

The cover part 44 is fixed to the base member 20. The cover part 44 and the base member 20 are fixed in a position of a lateral edge portion of the base member 20 herein. The fixing part FP5 between the cover part 44 and the base member 20 extends along a lateral edge of the base member 20. Herein, the cover part 44 and the band sheet 42 are not fixed to each other. The cover part 44 and the band sheet 42 may be fixed to each other. The cover part 44 and the base member 20 are not fixed to each other in an intermediate portion of the base member 20 in the width direction. The cover part 44 and the base member 20 may be fixed to each other in the intermediate portion of the base member 20 in the width direction. The cover part 44 and the base member 20 are not fixed to each other between the plurality of electrical wire bundles 34 parallelly arranged. The cover part 44 and the base member 20 may also be fixed to each other between the plurality of electrical wire bundles 34 parallelly arranged. In this case, the band sheet 42 may be omitted.

Any fixing state may be applied as a fixing state of the cover part 44 and the base member 20, and any fixing state described in the fixing state of the band sheet 42 and the base member 20 may also be applied, for example. The fixing state of the cover part 44 and the base member 20 may be the same as or different from that of the band sheet 42 and the base member 20. The cover part 44 is fused to the base member 20 herein.

According to such a wiring member 110, the extra length absorbing part absorbing the extra length of the electrical wires 30E, 30F, and 30G is provided on the base member 20. Accordingly, a tolerance of the electrical wires 30E, 30F, and 30G is absorbed on the base member 20. The extra length absorbing part includes the detour route part 35 in which the electrical wire 30 extends along the roundabout route compared with the shortest route between the first fixing part FP3 and the second fixing part FP4. Accordingly, the extra length absorbing part can be simply provided. The detour route part 35 is covered by the cover part 44, thus suppressed is an outward protrusion of the extra length part of the electrical wires 30E, 30F, and 30G.

Figure 7:
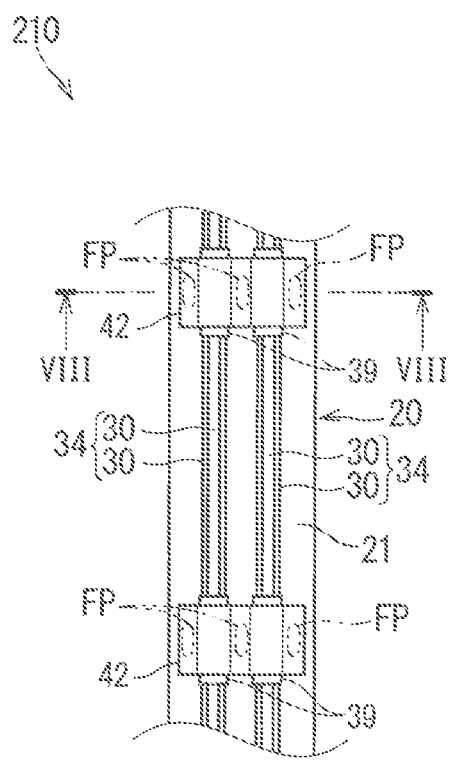
FIG. 7 is a plan view illustrating another modification example of the wiring member.
Figure 8:
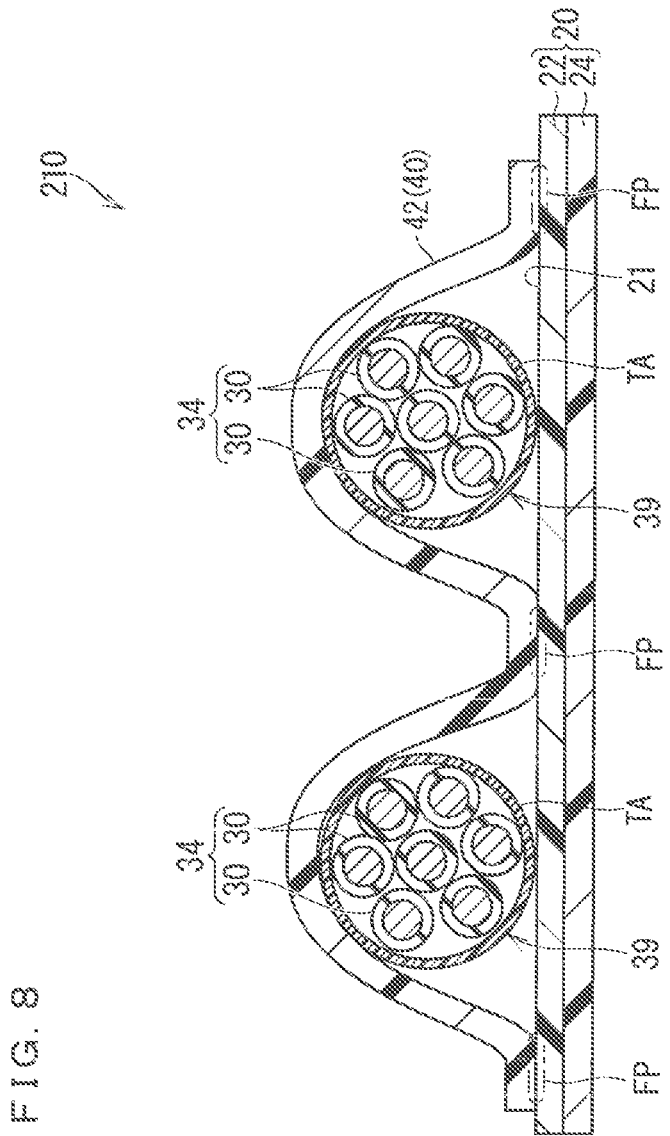
FIG. 8 is a cross-sectional view cut along a VIII-VIII line in FIG. 7.

FIG. 7 is a plan view illustrating another modification example of the wiring member 10. FIG. 8 is a cross-sectional view of the wiring member 10 cut along a VIII-VIII line in FIG. 7.

The electrical wire bundle 34 includes a tape winding part 39 in a wiring member 210 according to the modification example. The tape winding part 39 is a portion where the adhesive tape TA is wound. The electrical wire bundle 34 is not bundled by the adhesive tape TA in the wiring member 10 according to the embodiment 1, however, the electrical wire bundle 34 is bundled by the adhesive tape TA in the wiring member 210 according to the present example. The cover member 40 is fixed to the base member 20 in a lateral position of a portion covering the tape winding part 39. Accordingly, the electrical wire bundle is hardly unstuck in the tape winding part 39, and when the cover member 40 and the base member 20 are fixed, suppressed is the electrical wire 30 caught between the cover member 40 and the base member 20.

Herein, the plurality of tape winding parts 39 are provided at intervals along the extension direction of the electrical wire bundle 34. The tape winding part 39 may be wholly and continuously provided along the extension direction of the electrical wire bundle 34. The other band sheet 42 covers a position of each tape winding part 39. One cover member 40 may cover the plurality of tape winding parts 39 provided at intervals along the extension direction. Each band sheet 42 is fixed to the base member 20.

A portion where the tape winding part 39 is provided and a portion covered by the band sheet 42 may correspond to each other in the electrical wire bundle 34. That is to say, it is also applicable that the portion where the tape winding part 39 is provided is wholly covered by the band sheet 42, and the portion covered by the band sheet 42 is wholly provided with the tape winding part 39.

A portion where the tape winding part 39 is provided and a portion where the band sheet 42 is covered may not correspond to each other in the electrical wire bundle 34. The portion where the tape winding part 39 is provided may include a portion which is not covered by the band sheet 42. For example, the tape winding part 39 may be provided between the band sheets 42 when the electrical wire bundle 34 includes a large number of electrical wires 30. Accordingly, the plurality of electrical wires 30 constituting one electrical wire bundle 34 are hardly unstuck between the band sheets 42. The tape winding part 39 may be provided in the bending part 38, for example. Accordingly, the plurality of electrical wires 30 constituting one electrical wire bundle 34 are hardly unstuck in the bending part 38.

The portion covered by the band sheet 42 may include a portion where the tape winding part 39 is not provided. For example, the tape winding part 39 may not be provided in the portion covered by the band sheet 42 when the electrical wire bundle 34 includes a small number of electrical wires 30. Accordingly, an operation of winding a tape is simplified. When the electrical wire bundles 34 are branched from the main wire part to the branch wire part, for example, it is considered that the number of the electrical wires 30 constituting one electrical wire bundle 34 in the main wire part is larger than that of the electrical wires 30 constituting one electrical wire bundle 34 in the branch wire part. In this case, the tape winding part 39 may be provided around the electrical wire bundle 34 in the main wire part, and the tape winding part 39 may not be provided in the branch wire part.

In the example illustrated in FIG. 8, the tape winding part 39 is formed into a circular shape in cross-section. The tape winding part 39 may be formed into a flat shape in cross-section.

In addition, the plurality of electrical wires 30 may include an electrical wire (referred to as a hard fusion wire hereinafter) fused to the arrangement surface 21 more hardly than the wire-like transmission member 50. The hard fusion wire is assumed to be the different type of wire described above or a twisted wire, for example. The twisted wire is made up of a pair of twisted covering electrical wire transmitting a differential signal.

Specifically, when the twisted wire is arranged in the base member arrangement section, a lateral arrangement portion and a vertical arrangement portion are alternately arranged continuously along an extension direction of the twisted wire. The lateral arrangement portion is a portion where two covering electrical wires are arranged in a direction parallel to the arrangement surface 21. The vertical arrangement portion is a portion where two covering electrical wires are arranged in a normal direction of the arrangement surface 21. It is preferable that the lateral arrangement portion and the vertical arrangement portion are not misaligned as much as possible to prevent decrease in a noise suppression result in the twisted wire. When the electrical wire is fused to the arrangement surface 21, it is heated and pressed in some cases. At this time, when the twisted wire is pressed, it is difficult in some cases to set conditions to obtain favorable fusion strength without the misalignment of the lateral arrangement portion and the vertical arrangement portion. Thus, it is more difficult to fuse the twisted wire to the base member 20 than to a single core wire.

The configuration of three electrical wire bundles 34A, 34B, and 34C, the configuration of two electrical wire bundles 34D and 34E, and the configuration of two electrical wire bundles 34F and 34G in the non-base member arrangement section are not limited thereto described above, but can be appropriately changed, and can be optionally combined. For example, two electrical wire bundles 34D and 34E may constitute the large bundle part in the non-base member arrangement section.

When the plurality of non-base member arrangement sections are provided as with the wiring member 10 according to the embodiment 1, it is sufficient that the large bundle part 36 is provided in at least one of the plurality of non-base member arrangement section. The plurality of electrical wires 30 constituting the electrical wire bundle 34 in the base member arrangement section may include the electrical wire 30 which does not constitute the large bundle part 36. It is sufficient that at least some electrical wire 30 in the plurality of electrical wires 30 constituting the electrical wire bundle 34 in the base member arrangement section constitutes the large bundle part 36 in at least any one of the non-base member arrangement section. In the wiring member 10 according to the embodiment 1, the electrical wires 30D constituting the electrical wire bundles 34D and 34F in the base member arrangement section does not constitute the large bundle part 36 in the non-base member arrangement section. All of the plurality of electrical wires 30 constituting the electrical wire bundle 34 in the base member arrangement section may constitute the large bundle part 36 in at least any one of the non-base member arrangement section.

In the above example, both the shift region and the detour route part 35 are provided in the branch region, however, this configuration is not necessary. The shift region and the detour route part 35 may be provided between the fixing parts FP different from each other. For example, it is also applicable that one of the shift region and the detour route part 35 is provided in the branch region and the other one thereof is provided in the bending part 38. Even when the shift region and the detour route part 35 are provided between the same fixing parts FP, the region between the fixing parts FP may be the region between the fixing parts FP other than the branch region. For example, both the shift region and the detour route part 35 may be provided in the bending part 38. That is to say, the extra length absorbing part provided between specific fixing parts FP such as the detour route part 35 may be provided between the same fixing parts FP as the shift region. In this case, the position between the fixing parts FP is not particularly limited, however, any region between the fixing parts FP such as the branch region, the bending part 38, or the straight part is also applicable. It is also applicable that the extra length absorbing part between specific fixing parts FP such as the detour route part 35 is provided between first fixing parts FP and the shift region is provided between second fixing parts FP different from the first fixing parts FP. In this case, it is sufficient that the position between the first fixing parts FP and the position between the second fixing parts FP are different from each other, and each position may be any region between the fixing parts FP such as the branch region, the bending part 38, or the straight part.

Such a positional relationship between the extra length absorbing part and the shift region may be applied to a case where the extra length absorbing part such as the detour route part 35 is provided in the electrical wires 30 constituting the shift wire pair or a case where the detour route part 35 is provided in the electrical wire 30 different from the electrical wire 30 constituting the shift wire pair. That is to say, the shift region in the electrical wires 30 constituting the shift wire pair and the extra length absorbing part provided in the electrical wires 30 may be located between the same or different fixing parts FP. It is also applicable that the shift region in the electrical wires 30 constituting the shift wire pair and the extra length absorbing part provided in electrical wires different from the electrical wires 30 may be located between the same or different fixing parts FP.

In the example described above, the first wire-like transmission member covered by the cover member 40 is the electrical wire 30, however, this configuration is not necessary. It is sufficient that the first wire-like transmission member is a wire-like transmission member transmitting electrical power or light in the manner similar to the wire-like transmission member 50 as the second wire-like transmission member. In the example described above, all of the electrical wire bundles 34 are made up of only the electrical wires 30 transmitting electrical power, however, this configuration is not necessary. For example, at least one electrical wire bundle 34 may include a wire-like transmission member (for example, an optical fiber) transmitting light. Also adoptable is a wire-like transmission member bundle made up of only a wire-like transmission member transmitting light in place of at least one electrical wire bundle 34, for example.

The configurations described in the embodiments and modification examples thereof can be appropriately combined as long as they are not contradictory.

EXPLANATION OF REFERENCE SIGNS 10, 110, 210 wiring member
20 base member
20a, 20b, 20c end portion
21 arrangement surface
22 first layer
24 second layer
30, 30A, 30B, 30C, 30D, 30E, 30F, 300 electrical wire (first wire-like transmission member)
31 core wire
32 insulating covering (covering layer)
34, 34A, 34B, 34C, 34D, 34E, 34F, 340 electrical wire bundle (wire-like transmission member bundle)
35 detour route part
36 large bundle part 38 bending part
39 tape winding part
40 cover member
42, 42A, 42B band sheet
44 cover part
50 wire-like transmission member (second wire-like transmission member)
51 transmission wire body
52 covering layer
C, C1, C2, C3, C4, C5 connector
FP, FP1, FP2, FP3, FP4 fixing part
WP fusion part
L1, L2, L3 segment
T triangle
TA adhesive tape

The invention claimed is:

1. A wiring member comprising:
a plurality of wire-like transmission members;
a base member in which the plurality of wire-like transmission members are disposed on at least one surface; and
a cover member holding the plurality of wire-like transmission members in a state of being disposed on the base member, wherein
the plurality of wire-like transmission members include:
a base member arrangement section disposed on the base member; and
a non-base member arrangement section which is not disposed on the base member,
in the base member arrangement section,
the plurality of wire-like transmission members are divided into at least a first wire-like transmission member bundle and a second wire-like transmission member bundle,
the cover member is fixed to the base member at positions on both sides of the first wire-like transmission member bundle and the second wire-like transmission member bundle and a position between the positions on the both sides to cover the first wire-like transmission member bundle and the second wire-like transmission member bundle,
in the non-base member arrangement section,
the plurality of wire-like transmission members include a large bundle part where the first wire-like transmission member bundle and the second wire-like transmission member bundle are bundled together,
a plurality of fixing parts each made up of the cover member and the base member fixed to each other are provided at intervals along an extension direction of the first wire-like transmission member bundle and the second wire-like transmission member bundle, and
at least one shift region in which at least one wire-like transmission member constituting the first wire-like transmission member bundle transitions to the second wire-like transmission member bundle is provided between the plurality of fixing parts.

2. The wiring member according to claim 1, wherein
two or more of the wire-like transmission members constituting the first wire-like transmission member bundle transitions to the second wire-like transmission member bundle in one of the shift regions.

3. The wiring member according to claim 1, wherein
the base member and the cover member are fused and fixed to each other.

4. The wiring member according to claim 1, wherein
a plurality of wire-like transmission members constituting at least the first wire-like transmission member bundle include a wire-like transmission member having a covering layer formed of a material different from a material constituting the at least one surface.

5. The wiring member according to claim 1, wherein
when each of the plurality of wire-like transmission members covered by the cover member is a first wire-like transmission member,
the wiring member further includes a second wire-like transmission member including a transmission wire body and a covering layer covering the transmission wire body and disposed on the at least one surface, and
the covering layer of the second wire-like transmission member is fused to the at least one surface.

6. The wiring member according to claim 1, wherein
the first wire-like transmission member bundle includes a bending part disposed along a curved route on the at least one surface, and
the cover member is fixed to the base member in positions on both sides of the bending part.

7. The wiring member according to claim 1, wherein
the first wire-like transmission member bundle includes a tape winding part in which an adhesive tape is wound, and
the cover member is fixed to the base member in a lateral position of a portion covering the tape winding part.

8. The wiring member according to claim 1, wherein
an extra length absorbing part absorbing an extra length of the wire-like transmission member is provided on the base member.

9. The wiring member according to claim 8, wherein
a first fixing part and a second fixing part in which the cover member and the base member are fixed are provided at intervals along an extension direction of the first wire-like transmission member bundle and the second wire-like transmission member bundle, and
the extra length absorbing part includes a detour route part in which a route of the wire-like transmission member extends along a roundabout route compared with a shortest route between the first fixing part and the second fixing part.

10. The wiring member according to claim 9, wherein
the cover member includes a portion covering the detour route part.

11. The wiring member according to claim 1, wherein
the cover member includes a plurality of band sheets provided at intervals along the extension direction of the first wire-like transmission member bundle and the second wire-like transmission member bundle, and
each of the plurality of band sheets is fixed to the base member at positions on both sides of the first wire-like transmission member bundle and the second wire-like transmission member bundle and a position between the positions on the both sides.

12. The wiring member according to claim 1, wherein
the first wire-like transmission member bundle and the second wire-like transmission member bundle extend to an outer side of the base member from a plurality of end portions of the base member.

* * * * *